United States Patent [19]

Grigorov et al.

[11] Patent Number: 5,777,292
[45] Date of Patent: Jul. 7, 1998

[54] MATERIALS HAVING HIGH ELECTRICAL CONDUCTIVITY AT ROOM TEPERATURES AND METHODS FOR MAKING SAME

[75] Inventors: Leonid N. Grigorov, Moscow, Russian Federation; Kevin P. Shambrook, Forestville, Calif.

[73] Assignee: Room Temperature Superconductors Inc., Sebastopol, Calif.

[21] Appl. No.: 595,305

[22] Filed: Feb. 1, 1996

[51] Int. Cl.$^6$ .............................. H01B 1/14; H01B 1/20; H01B 1/06; C08J 3/28
[52] U.S. Cl. ................ 204/157.15; 252/500; 252/510; 204/157.6; 204/157.63; 522/99; 522/148
[58] Field of Search ..................... 252/500, 502, 252/510, 511; 204/157.15, 157.6, 157.61, 157.63; 522/148, 99

[56] References Cited

PUBLICATIONS

Grigorov et al., "The superconductivity at room temperature and much higher in new polymer films", Mol. Cryst. Liq. Cryst. 1993, vol. 230, pp. 130–138.
Spangler et al., "Design strategies for the preparation of polymeric organic superconductors", Final Technical Report, 1996, AFOSTER–TR–96–0365; Order No. AD–A311179, 29 pp.
Eagles, "A conjectured explanation for room–temperature superconductivity in narrow channels in oxidised polypropylene", Submitted for publication in the *Journal of Superconductivity*, July 1993.
Grigorov et al., "On genuine room–temperature superconductivity in high–conductivity channels in oxidized polypropylene", Superconductivity, 4(2), pp. 345–352, Feb. 1991.
Demicheva et al., "Destruction of ultrahigh conductivity of oxidized polypropylene by critical current", JETP Lett., vol. 51, No. 4, Feb. 1990.
Smirnova et al., "Some characteristics of anomalous conduction of thin layers of polypropylene", NASA Technical Translation, July 1993 from Vysokomolekularne.
Shklyarova, et al., "New type of polarization of oxidized polypropylene films", Vysokomolekylyamye soyedineniya, vol. 32B, pp. 885–886, 1990.
Demicheva et al., "Anomalously high electroconductivity and magnetism in films of silicone natural rubber", Visokomol. Soedin. B., 32, No. 1, pp. 3–4 (Nov. 1990).
Enikolopyan et al., "Possible superconductivity near 300K in oxidized polypropylene", American Institute of Physics, JEPT Lett., vol. 49, No. 6, pp. 371–375, Mar. 25, 1989.
Peng et al., "Correlation between positron annhilation parameters and the conductivity for conducting polymer", Materials Science Forum, vols. 175–178, pp. 747–750, 1995.

*Primary Examiner*—Kathryn L. Gorgos
*Assistant Examiner*—Alex Noguerola
*Attorney, Agent, or Firm*—Pillsbury Madison & Sutro LLP

[57] ABSTRACT

A method is disclosed for producing a polymer material whose room temperature conductivity exceeds $10^6$ S/cm. In a preferred embodiment the material is produced in the form of a film having thickness less than 100 μm. Conduction takes place through threads passing through the film which is otherwise a dielectric. The film is produced by first depositing a macromolecular polymer substance on a substrate. During preparation, the substance must be in a viscose liquid state. Stable free electrons (polarons) are then created by ionizing the substance. This is assisted by exposure to UV radiation and the presence of strong polar groups in the polymer. Various techniques, such as applying a strong electric field, are then used to join the polarons together into conducting threads within the medium. To stabilize the conductivity, the medium is then solidified by cooling it below its glassing point or inducing cross-linking between the macromolecules.

79 Claims, 8 Drawing Sheets

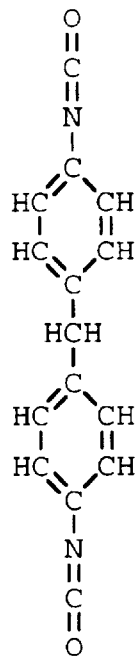
4,4'-methylene-biphenyl isocyanate
FIG. 6
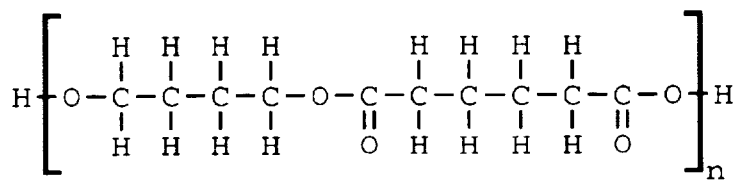
poly(buthyleneglycol adipinat)
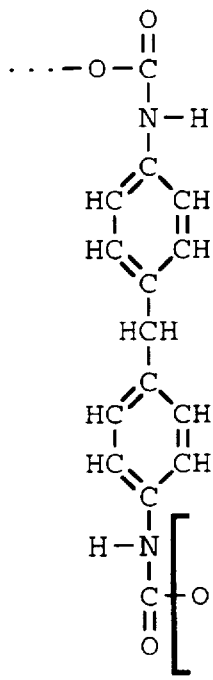
FIG. 7
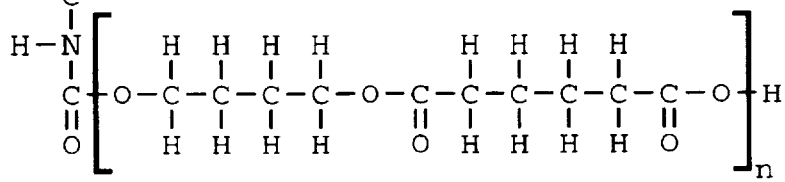

MATERIALS HAVING HIGH ELECTRICAL CONDUCTIVITY AT ROOM TEPERATURES AND METHODS FOR MAKING SAME

FIELD OF THE INVENTION

This invention relates to materials having very high electrical conductivity. More particularly, it relates to highly conductive materials formed from high molecular weight compounds and techniques for producing such highly conducting materials.

BACKGROUND OF THE INVENTION

Because electrical conductors play such a fundamental and ubiquitous role in modern technology, improvements in conductors are of obvious importance and utility. In particular, because electrical resistivity in conductive materials results in irreversible dissipation of energy, it is clearly desirable to produce materials having a very high conductivity, especially materials having a very high conductivity at room temperatures. In addition, conductive materials have many applications in addition to the conduction of electrical energy. Useful conductive materials generally fall into two broad classes: Inorganic non-molecular conductors (such as metals, metal alloys and metal oxides or ceramics) and organic and organo-element molecular conductors (such as polymers and organic salts).
Metals, Metal Alloys, and Metal Oxides Metals and metal alloys are presently the most widely used electrical conductors. In the bulk they have an ionic crystalline lattice and have no chemical bonds. Although these materials have good room temperature conductivity ($(\sigma \approx 10^5$ S/cm), their resistivity is still large enough to create significant power losses, especially at high currents. Due to the reduction in conduction electron scattering at lower temperatures, the resistivity of metals may be slightly decreased by cooling. This decrease in resistivity at lower temperatures, however, is not generally large enough to compensate for the energy required to cool the conductor. In 1911 Kamerlingh Onnes made the remarkable discovery that below a certain critical temperature $T_c$ certain metals experience an electronic phase transition from a normal state to a superconducting state in which the DC electrical resistance suddenly drops to zero. Because the transition temperature of most metals is within ten degrees of absolute zero, however, superconducting metals have had limited technological utility.

Ceramic metal oxides, like metals, have a crystalline atomic lattice. In contrast to metals, however, they are poor conductors at room temperature. Surprisingly, in 1987 some ceramic metal oxides were discovered which have superconducting transition temperatures around 100K. Because it is much easier to cool down to 100K than down to 10K, these new "high temperature" superconductors have greater potential for technological application than the conventional superconducting metals. Nevertheless, in spite of their name these "high temperature" superconductors still must be cooled to temperatures very low compared to room temperature and are therefore severely limited in their potential applications.

For many years it was thought that all superconductors shared the characteristic properties common to the metal superconductors that were first discovered. It is now recognized, however, that there are different types of superconductors, some of which do not share all of the properties of the common metal superconductors. Moreover, it is important to recognize that although the BCS theory of superconductivity (Phys. Rev. 108:1175(1957)) explains the superconductivity of metals, it fails to explain less common types of superconductors. For example, there is at present no physical theory that fully explains the high temperature ceramic superconductors. In view of the experimental discovery of these ceramic superconductors and the failure of present theories to explain them, it follows that there must be mechanisms for superconductivity presently unknown to science.

Because the mechanisms and characteristic properties of new types of superconductors are presently unknown and are certainly different in essential respects from those of conventional superconductors, such new types of conductors will be called highly conductive materials in order to avoid confusion with conventional superconductors and their characteristic properties. We define a highly conductive material to be a material whose conductivity $\sigma$ can exceed $10^6$ S/cm. Although all superconductors are necessarily highly conductive materials, all highly conductive materials are not necessarily superconductors in the limited sense of the word. In particular, an ideal conductor is a highly conductive material but not a superconductor.

An interesting highly conductive material is reported by R. Bourgoin in U.S. Pat. No. 4,325,795. It discloses a process for making a material composed of conductive particles (bismuth powder) suspended in dielectric polymer (epoxy resin). The two components are mixed together and treated by a very specific procedure to form an extremely small filament whose diameter is between 10 Å and 1,000 Å. The patent claims that the conductivity of these filaments displays superconducting properties at room temperature, namely, conductivity exceeding that of metals ($\sigma \geq 10^6$ S/cm). Bourgoin teaches that the concentration of Bismuth must be at least 10% by volume in order to obtain high conductivity. There is presently insufficient information and experimental testing to determine the stability of Bourgoin's material and this material apparently has not found useful applications and has not been brought into production.
Organic and Organo-element molecular conductors More than twenty years before the discovery of ceramic high temperature superconductors, W. A. Little, professor of physics at Stanford University, discovered that it was theoretically possible for certain compounds of limited dimensionality to exhibit superconductivity at unusually high temperatures (Phys. Rev. 134:A1416(1964)). This work raised the possibility of a new type of superconductor that would differ dramatically from common superconductors in certain fundamental respects. The superconductors that Little envisioned were not bulk metals or ceramics, but polyconjugated polymers having quasi-one-dimensional band structures. Although no superconductivity has yet been observed in polyconjugated polymers, Little's work has motivated both experimental and theoretical work investigating the possibility of both organic superconductors and organic conductors.

A common type of organic conductor is the class of polymers having a well defined conjugation system in their main molecular chain, i.e. periodic alternation of single and double bonds in the chain. Polyacetylene, for example, is in this class. Its well organized conjugation system creates the properties of a semiconductor. When doped, however, the conductivity of polyacetylene increases to near metallic levels ($\sigma \approx 10^5$ S/cm). Polyacetylene is typically a macromolecular compound, i.e. its molecular weight is more than 1000 amu. Usually the content of the crystalline phase of polyacetylene is much more than 50%, making it a relatively rigid material. The conductivity of polyacetylene drops dramatically if either the concentration of single bonds becomes too high (i.e. more than 75%) or trace amounts of oxygen are introduced.

In the 1980s certain organic salts were discovered with superconducting critical temperatures $T_c < 12K$. Although these compounds, in contrast to the metals and ceramics, have a well-defined molecular weight (on the order of 100 amu), they still form crystalline structures. Like the ceramics, there is presently no theory that fully explains the mechanism of superconductivity in these organic salts.

Recently the discovery of certain polymer films that are highly conducting at room temperature were reported by L. N. Grigorov, D. N. Rogachev, and A. V. Kraev in the article *Polymer Science, Vol. 35, No 11* (1993). Two macromolecular polymers were discovered, oxidized atactic polypropylene (OPP) and polydimethylsiloxane (PDMS), each of which may be used to produce such films. In contrast to the conjugated polymer conductors, both OPP and PDMS are nonconjugated polymers and are not doped. Unlike Bourgoin's material, these films do not require the addition of conducting particles. Both the OPP and PDMS used have a very high molecular weight (greater than 10,000 amu). The main chains and side substitutes of both are completely saturated and contain only single bonds, although a negligible number of double bonds can appear during the oxidation of OPP. Both oxidized OPP and PDMS contain a significant amount of oxygen which increases the static dielectric constant. It is important to note also that films made from either of these compounds is in a viscose liquid state and have a very small crystalline phase. The most remarkable feature of these films is that the room temperature conductance through the films has been directly measured by several different techniques to be at least five orders of magnitude greater than that of metal, i.e. $\sigma \geq 10^{11}$ S/cm. Moreover, indirect magnetic techniques estimate that $\sigma \geq 10^{20}$ S/cm.

It is important to note that the high conductance takes place only in certain narrow ($\approx 1$ μm) channels running through the film perpendicular to the surface. Electronic threads running through these channels are surrounded by nonconducting regions from which the threads can not be isolated. One problem with these films that limits their practical utility is that the density of these conducting threads is very low. Another difficulty is that the threads rarely appear in films greater than about 10 μm in thickness. The primary problem with these conducting films, however, is that the conductivity through the film is very unstable at room temperature and can appear and disappear spontaneously under constant conditions. Moreover, the teaching of the prior art does not contain any theory or understanding of the necessary properties of these highly conductive compounds, nor does it enable one to predict what related compounds might also display similar conductive properties or what methods may be used to improve the stability of the conductivity. Because of the combination of these disadvantages, these films are of extremely limited utility.

OBJECTS AND ADVANTAGES OF THE INVENTION

Accordingly, it is a primary object of the present invention to provide a class of highly conductive materials that overcomes the disadvantages of the prior art discussed above. In particular, it is a primary object of the invention to provide a class of polymer materials whose conductivity at room temperature is stable and significantly greater than $10^6$ S/cm. It is an additional object of the invention to provide such materials which can be used in practical technological applications. It is a further object of the invention to provide a method for producing such highly conductive materials. It is a more particular object of the invention to produce a class of polymers which may be used to produce materials having highly conducting threads that are both stable and high in density. It is another object of the invention to provide such materials with threads of practically useful length. These and other objects of the invention will be evident from the following description and drawings.

SUMMARY OF THE INVENTION

These objects and advantages are attained by providing methods for producing materials having stable and very high conductivity at room temperatures. The disclosed method comprises forming a medium of macromolecular substance, generating free electrons in the medium, inducing these electrons to form electronic threads through the medium, and substantially solidifying the medium to stabilize the positions of the threads. In the preferred embodiment the substance is a polymer having at least 76.8% single bonds and a molecular weight of at least 2000. The polymer may be a hydrocarbon modified by oxygen such as oxidized atactic polypropylene or oxidized isotactic polyhexene. It also may be a polyurethane or a polymer such as polydimethylsiloxane which has a silicon-oxygen main chain. The method preferably includes forming a thin film of the medium and exposing it to UV light in order to assist in the formation of free electrons. The generation of electronic threads is preferably assisted by one of various techniques such as heating the medium and exposing it to an electric field, microwaves, or ultrasound. In order to stabilize the position of the threads to allow reliable conduction through the medium, the method includes a solidification of the medium. In a preferred embodiment the solidification is accomplished by cross-linking or by cooling.

The material produced by the invention has stable electronic threads whose room temperature conductivity is greater than $10^6$ S/cm. In a preferred embodiment the material is characterized by a Young's modulus greater than 0.1 MPa, and oxygen content between 0.1% and 13%, more than 76.8% single bonds, and a static dielectric constant greater than 2.4.

DESCRIPTION OF THE DRAWING FIGURES

FIG. 6 shows the chemical structures of two components used to form a polyurethane, a polymer used to produce a conductive material according to the invention.

FIG. 7 shows the chemical structures of the polyurethane produced by the copolycondensation of the two polymers shown in FIG. 6.

DETAILED DESCRIPTION OF THE PREFERRED EMBODIMENTS

Theoretical Background

Figure 1:
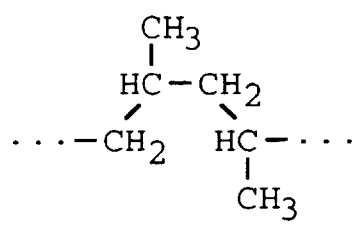
FIG. 1 shows the chemical structure of APP, a polymer used to produce a conductive material according to the invention.

The invention is based on two discoveries which have simple theoretical explanations from the viewpoint of modern physics and physical chemistry.

The first discovery is that if several conditions are fulfilled some macromolecular substances may be an exception to the well known fact that organic and elementorganic compounds usually have no free electric charges for the conduction of electric current. These conditions are: the substance must be in a viscose liquid state, the macromolecules must contain a certain amount of polar groups having a large dipole momentum (e.g. >C=O, —HC=O, —OH), and the substance must have a low percentage of double bonds (low degree of conjugation). Note that the large dipole momentum in some compounds may be provided by the elements in the main chain (e.g. Si—O) rather than side groups.

The reasons for these conditions are as follows. Due to the high flexibility of the long macromolecular chains while in the viscose liquid state, the polar groups can easily change their spatial positions and orientations. As a result, the substance is endowed with a high static dielectric constant and has properties close to those of low molecular weight polar solvents. It is well known that electrolytic dissociation in polar solvents leads to spontaneous charge separation and results in the appearance of some small concentration of free positive and negative charges. It has been discovered by the inventors that a similar process takes place in the case of many macromolecular substances provided they are in a viscose state and have polar groups. Rather than the production of negative ions as in the case of electrolytic dissociation, in this case free electrons appear that are surrounded by oriented dipole groups. These free electrons are known in physical chemistry as "solvated electrons" and in physics as "polarons". Typical equilibrium concentration of these polarons range from $10^{14}$ to $10^{18}$ polarons per $cm^3$. The polarons are not bonded with parent macromolecules and can move due to heat motion in a flexible liquid macromolecular medium. The free movement of polarons, however, can be lost if the macromolecules have a significant number of conjugated bonds because large conjugated systems can effectively trap the free electrons in empty electron energy levels. In a macromolecular substance satisfying all three conditions, therefore, the substance can experience self-ionization and the charges produced can remain free. The electron mobility, however, is initially quite low compared to metals.

The second discovery made by the inventors dramatically increases the electron mobility. It is found that under certain conditions the state of homogeneously spreaded polarons becomes unstable and due to their mobility polarons begin to join each other resulting in the formation of stable multielectron structures we shall call "superpolarons". Each superpolaron may be visualized as a long multielectron thread running through a cylindrical channel. The thread is surrounded by a cloud of homogeneous positive ions and a shell of dipoles oriented in a radial direction by the strong electrical field of the thread. This polarized shell creates a potential well which keeps all the electrons together in the channel and creates a strong overlapping of their wavefunctions. This situation has remarkable consequences. Because the well is a quasi-one-dimensional system, the electrons can obtain a mobility several orders of magnitude higher than that of metals. Moreover, the overlapping of their wave functions also creates a strong exchange interaction which counters the effect of Coulomb repulsion. Quantum mechanical calculations by the inventors show that the combined influence of both the polarized shell and the strong exchange interaction is sufficient to provide the stable existence of a superpolaron's multielectron structure. It is also known from quantum theory that the exchange interaction is most pronounced in the case of quasi-one-dimensional systems. Quantum mechanical calculations by the authors also show that there are no theoretical limitations on the length of superpolaron threads. It should be noted that the inventors have observed that, like superconductors, the conductors of the invention dramatically violate the Wiedemann-Franz law. These conductors, therefore, can be used as thermal insulators and other applications involving quantum coherence.

In addition to the three conditions for the creation of stable polarons, there are additional conditions for the creation and stability of a superpolaron structure: the concentration of electrons in the superpolaron's thread must be on the order of $10^{20}$ to $10^{21}$ electrons/$cm^3$, the static dielectric constant must be significantly more than the high frequency dielectric constant (i.e. at least 2.4 to 3), and the medium must be simultaneously flexible and viscose. The reasons for these conditions are as follows. The concentration of electrons in the thread must be sufficiently high in order to provide a strong exchange interaction and high electron mobility. Because this concentration is 2-3 orders of magnitude more than the mean concentration of polarons in the self-ionized macromolecular medium, this condition can only be fulfilled if the medium also satisfies the condition that it is flexible enough that the polarons may be collected together. This explains why the superpolaron structure does not appear in the solid state or in highly crystalline compounds. The condition on the static dielectric constant ensures that a sufficiently deep potential well may be created. Although the medium must be flexible enough to permit the creation of polarons and superpolarons, it must also be viscose enough to permit their stability. This explains why superpolarons have not been observed in low molecular weight polar liquids. Only high molecular weight compounds can satisfy this condition because they simultaneously have high flexibility and high viscosity.

The inventors have made the additional discovery that it is possible to improve the stability of the superpolaron structure through chemical alterations of the medium. Because the medium must be flexible enough to allow for the initial creation of superpolarons, once they are formed this flexibility also threatens to destabilize the superpolarons. Even in the case where the superpolaron is stable, Brownian motion can interrupt conductivity by shifting the superpolaron's position at the surface of the medium where electrical contact is made. In order to prevent these effects, the inventors have discovered that suitable polymers can be used whose state may be changed from viscose liquid to solid after the creation of superpolarons. After such a transition, the conductivity becomes very stable provided the Young's modulus of the hardened medium exceeds 0.1 MPa.

Method of Producing Stable and Highly Conductive Material

In accordance with the understanding presented above, the inventors have discovered the following method for producing stable and highly conductive materials. In general outline, the method comprises the following steps. First, an appropriate initial chemical compound is chosen that satisfies the conditions for the formation and stabilization of superpolarons. In accordance with the teaching of the invention, this initial compound is preferably a macromolecular substance formed as a film. Second, the initial compound is activated or ionized so that free electrons (polarons) are generated in the macromolecular medium. The properties of the activated substance may differ in some ways from those of the initial substance. Third, superpolarons are formed in the activated substance. The combination of polarons into superpolarons is associated with an appearance of and subsequent increase in the ferromagnetic momentum of the substance. This step may include substeps to speed up the creation of superpolarons or to concentrate the superpolarons that have been created. Fourth, the formation of a desired electrical conductor material using the superpolarons as "bricks". Fifth, the stabilization of the substance in order to obtain stable conductivity in the substance. Note that these steps may in some cases take place simultaneously with each other.

Step 1. Choosing the initial compound

Several quite different macromolecular substances can be chosen as the initial compound. In their initial inactivated state all of them are quite good electric insulators, have more than 76.8% single bonds, and have molecular weights more than 2000 amu. In some embodiments the substance may have an initial static dielectric constant less than 2.4, but in all cases the substance in its final state has a static dielectric constant greater than 2.4. The initial compounds fall into three broad classes: hydrocarbons, silicon-oxygen based polymers, and a polyurethane produced by copolycondensation of two components. Preferably, the hydrocarbon is either atactic polypropylene (APP) or isotactic polyhexene (IPH), and the silicon-oxygen polymer is one of four polymers with various end and side groups.

A. APP

APP has the chemical formula $(-C_3H_6-)_n$ and has the chemical structure shown in FIG. 1. The APP molecules preferably have a molecular weight from 4,000 amu to 100,000 amu. Molecular weights more than 100,000 amu can be used also but these are generally more difficult to synthesize. The main chain of APP is made of carbon atoms only. The side groups are hydrogen atoms and methyl groups directed randomly along the chain, causing APP to be completely amorphous. In the bulk APP molecules are linked only by weak Van der Waals forces, making APP a viscose liquid at room temperature. The structure of APP may be stabilized by cooling below the glassing temperature ($\approx -20$ C.). In order to purify APP prior to preparing an electrical conductor it is often useful to dissolve it in heptane.

B. IPH

Figure 2:
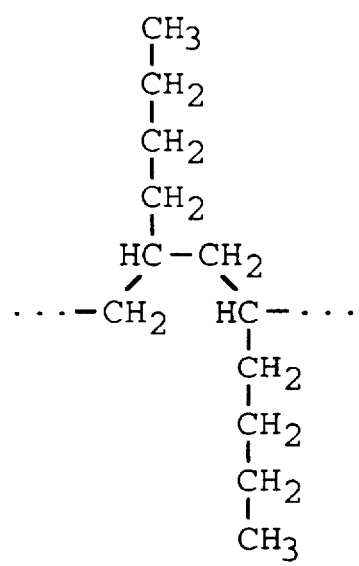
FIG. 2 shows the chemical structure of IPH, a polymer used to produce a conductive material according to the invention.

The second hydrocarbon that is preferably used as the initial compound is IPH which has the chemical formula $(-CH((CH_2)_3CH_3)CH_2-)_n$ and the chemical structure shown in FIG. 2. Preferably, the IPH molecules used have a molecular weight from 300,000 amu to 1,000,000 amu. High molecular weight IPH molecules can be easily synthesized because of the regular (isotactic) intramolecular structure. The long side groups in IPH prevent any crystalline structure from developing in the bulk. In order to stabilize IPH one may cool it below its glassing point ($\approx -55$ C.).

C. Silicon-Oxygen Polymers: PDMS and alterations thereof

There are several various silicon-oxygen polymers that are preferred as the initial compound for the formation of an electrical conductor according to the invention. They are all based on a chain of the form $(-Si-O-)_n$, with variations on the side groups and end groups. Because this main chain has such a high flexibility, these polymers have a highly amorphous structure and their glassing point is typically low (usually around $-130$ C.).

Figure 3:
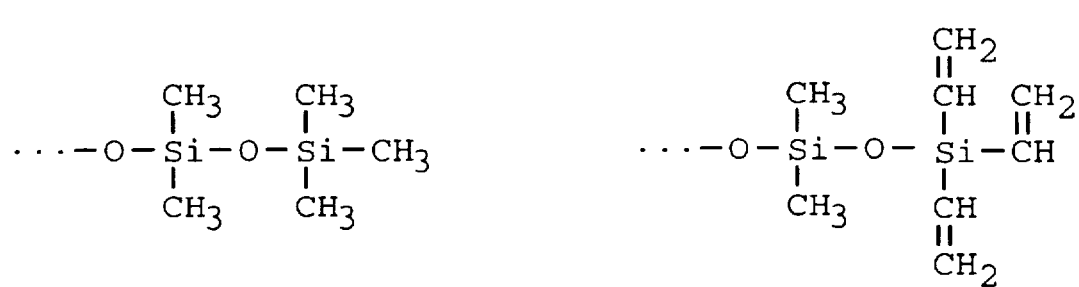
FIG. 3 shows the chemical structure of two forms of PDMS, a polymer used to produce a conductive material according to the invention.

The first type of silicon-oxygen polymer is polydimethylsiloxane (PDMS). In one embodiment, PDMS has three methyl end groups at each end of the chain and preferably has a molecular weight more than 300,000 amu. In an alternate embodiment, PDMS has three vinyl end groups at the end of each chain and preferably has a molecular weight more than 15,000. The chemical structures of these compounds are shown in FIG. 3.

In the case where PDMS has methyl end groups, chemical bonds between the PDMS molecules do not form. Consequently, this substance is a viscose liquid at room temperature and its stabilization is accomplished by cooling below the glassing point. On the other hand, in the case where PDMS has vinyl end groups, it is also initially a viscose liquid at room temperature, but it may be stabilized through cross-linking, i.e. breaking the double bonds of the vinyl end groups and forming chemical bonds between PDMS molecules. This chemical reaction can be induced at the desired moment by a special catalyst or by heat. The cross-linking transforms the viscose liquid into a solid. Because cross-linking is possible in this case, the molecular weight does not need to be as high as when cross-linking does not take place. This has the advantage that activation and formation of superpolarons can take place much faster when the molecules are smaller.

Figure 4:
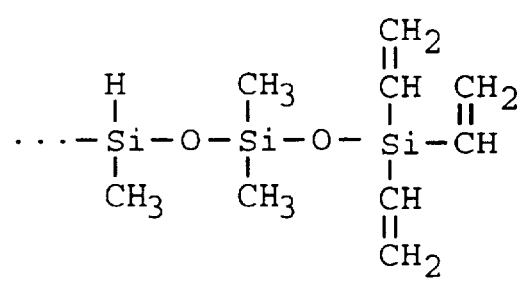
FIG. 4 shows the chemical structure of a PDMS copolymer, a polymer used to produce a conductive material according to the invention.

The second type of silicon-oxygen polymer is identical to the compound just described except that some of the methyl side groups are replaced by hydrogen to form a copolymer, as shown in FIG. 4.

The substitution of hydrogen atoms permits quicker and stronger stabilization when cross-linking because the hydrogen can easily link with the vinyl end groups. Preferably, smaller molecules (down to as small as 2000 amu) are used in order to increase the number of ends that can cross-link and increase the stability. With this molecule, the preferred fraction of methyl side groups that are replaced with hydrogen is 25%.

Figure 5:
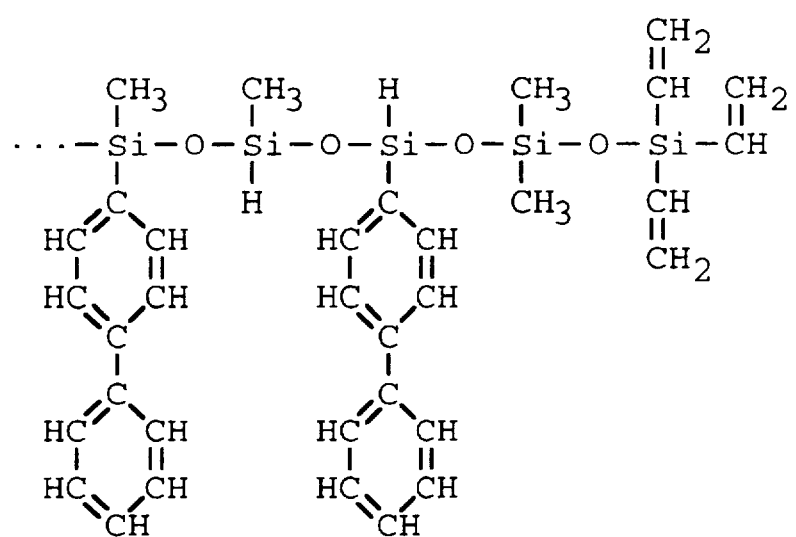
FIG. 5 shows the chemical structure of yet another form of PDMS, a polymer used to produce a conductive material according to the invention.

In order to increase the density of cross-linking and improve stabilization, it is desirable to decrease the number of links in the main chain without decreasing the molecular weight. One way to accomplish this is to substitute large diphenyl groups for the methyl side groups. This can be combined with the substitution of hydrogen side groups as discussed above. An example of such a copolymer is shown in FIG. 5.

Although a conductor may be formed from any one of the above silicon-oxygen polymers, conductors may also be formed through a combination or mixture of several of the above polymers and copolymers. One preferred mixture is PDMS having methyl end groups mixed with the copolymer having vinyl end groups and diphenyl side substitutes. The most preferred mixture is the copolymer having vinyl end groups and hydrogen side substitutes mixed with the copolymer having vinyl end groups and no side substitutes. Moreover, different side substitutes altogether may be used to provide additional variations of the above polymers. For example, acrylic side substitutes may be used as well, allowing cross-linking under shortwave UV treatment. Therefore, it will be appreciated by those skilled in the art that other side substitutes may be used in accordance with the teaching of the invention in order to obtain the necessary conditions for stabilization. Anyone of ordinary skill in the art would consider such alternate side substitutes obvious in view of the teaching provided herein. Moreover, other mixtures may be produced to facilitate the creation and stabilization of conductors as well.

D. Polyurethanes

The initial compound used for the creation of the conductor may also be chosen from the class of polyurethanes. Preferably, the polyurethane is the product of a copolycondensation of two components, 4,4'-methylenebiphenyl isocyanate and poly-(buthyleneglycol adipinat), whose chemical structures are shown in FIG. 6.

The factor n is chosen so that the second component has a molecular weight around 2000 amu. During copolycondensation the two components are connected into large links. The resulting copolymer has the chemical structure shown in FIG. 7.

This polymer contains a high concentration of specific chemical groups (i.e., OC=O) having large dipole momentum, giving it a larger static dielectric constant of about 4. The oxygen content is preferably between 6.6% and 15.7%. Usually it is near 12%. The preferred molecular weight of this compound is between 4500 amu and 10,000 amu. It can be dissolved in various organic solvents, for example, dimethylformamide. In contrast to the previous compounds discussed, this compound may be partially crystallized at room temperature, with the crystalline phase at thermodynamic equilibrium being above 50% by volume. This polymer, however, may be converted to a completely amorphous phase by heating above 62 C. Once superpolarons have been formed it can then be cooled back down to room temperature. Note, however, that it may take hours or days for the crystalline content to reach equilibrium.

All the initial chemical compounds discussed above may be used for the electrical conductor preparation, as well as variations of these and alternate compounds as would be obvious to those skilled in the art in view of the teaching contained herein. Indeed, as has been shown through the above examples and explained in the theoretical description, an appropriate chemical substance may have quite a different fine chemical structure and may be based on different main chain constructions. The substance need only have certain physical properties. In particular, a satisfactory initial compound must be in an amorphous viscose liquid state during certain stages of the preparation of the conductive material. The static dielectric constant of the initial compound must be capable of reaching more than 2.4 after the compound is activated. The initial compound (after any cross-linking) should have a low mean fraction of conjugated pieces. Preferably, the concentration of single bonds should be greater than 76.8% of the total number of chemical bonds. The initial compound must be a macromolecular substance having a molecular weight of at least 2000 amu. The initial compound must also have the property that it can be stabilized after forming the conductor, either by cross-linking or by cooling down to a temperature where the matrix becomes sufficiently stable. Finally, it should be noted that the selection of the initial compound may also be subject to considerations of the particular conditions under which the conductor will eventually be used.

Step 2. Activating the compound

The aim of this step is to generate and accumulate stable free electrons in the macromolecular medium. The activation comprises several steps common to all the initial substances. Certain substances, however, require additional steps due to their particular characteristics.

In order to create stable free electrons in the macromolecular substance, the electrons must first be ionized and then stabilized in the macromolecular medium. The inventors have discovered that stable free electrons can be created under circumstances where flexible macromolecular chains having polar chemical groups are adsorbed on the surface, or if macromolecules participate in the surface interphase interaction between two different phases which are present together in a heterogeneous medium. From a thermodynamical point of view, electrons can be stabilized in a free state only if the macromolecular ions and the electrons are strongly solvated by the polar medium, giving the necessary energetic gain to prevent Coulomb bonding. From a kinetic point of view, ionization is normally very improbable due to the high energy of 5 eV to 6 eV that is required. But it is well known to those skilled in surface chemistry and heterogeneous catalysis that certain processes which are normally forbidden or highly improbable in the bulk can easily take place at the surface of a medium. In particular, a large molecule adsorbed on a solid surface has a large energy of adsorption which causes the molecule to be in specific conformations that enhance its polarization and deformation. As a result, the ionization potential can be dramatically reduced. In short, while the macromolecules in the bulk may be difficult to ionize, the same molecules adsorbed on the surface can be ionized easily, perhaps with the help of relatively weak ionization factors such as thermofluctuations or exposure to UV radiation. Once a stable macroion has been created at the surface, it is then desorbed from the surface and migrates into the volume of the medium. Because the diffusion can be quite slow, it may take days or even weeks for a high concentration of free electrons to accumulate in the volume of the material. This time can be reduced, however, if the ratio of surface area to volume is very high during the activation stage of the conductor preparation, e.g. by activating the medium while in the form of a thin film.

The first stage of the activation in the preferred embodiment is to increase the ratio of surface area to volume by forming a thin film of the macromolecular substance on the surface of a solid substrate. Although films as thick as 100 μm have been produced, preferably the film has a thickness of 20 μm to 30 μm, except for the silicon-oxygen polymer films which have a preferred thickness of 5 μm to 15 μm. The nature of the solid substrate is not very significant and could be a metal, glass, semiconductor or any other solid that does not react chemically with the film. Preferably, the film is formed on the surface of gold or glass. The film may be prepared by techniques well known in the art, such as by melting. The film may also be prepared by dissolving the compound in a solvent, spraying the solution over the surface of the substrate and evaporating the solvent. To speed the evaporation process, the film may be heated, preferably to temperatures between 40 C. and 70 C., except for the polyurethane compound which is preferably heated near 80 C. so that it is well above its melting point of 62 C. Note that if the film is formed by sputtering or spraying, the activation process may be enhanced by ionizing the droplets as they are deposited.

If the initial compound chosen was one of the hydrocarbons, then the activation step includes a thermooxidation of the film in order to introduce oxygen-containing polar groups. The film is heated in air at a temperature of 100 C. to 110 C. for 1-2 hours. The exact duration of the heating may be controlled by monitoring the IR-spectrum and static dielectric constant of the film until they indicate the presence of carbonyl groups. When the content of oxygen reaches at least 0.1 atomic % and the static dielectric constant reaches at least 2.4, the thermooxidation is complete.

The next stage in the activation of the film is the exposure of the film to UV radiation in order to help adsorbed macromolecules become ionized. In the preferred embodiment, a 120 Watt mercury lamp having a 5 cm tube at a working pressure of 0.2-0.3 MPa is positioned about 5 cm from the film. Any other method of exposing the film to similar UV radiation, however, will be sufficient. A typical exposure time under the above conditions is 1.0-1.5 hours, except for the silicon-oxygen polymers which are typically exposed for 4-6 hours. The exact duration of exposure can be controlled by monitoring the magnetic properties of the film. From an analysis of the form and intensity of the dependence of the magnetic moment on the applied external magnetic field, one can determine the concentration of stable free electrons in the film. When the concentration of free electrons is at least $3 \times 10^{17}$ electrons/cm$^3$, then the UV irradiation is complete. It should be noted that overexposure to UV radiation can begin to break the main chains of the macromolecules.

To enhance the diffusion of the ionized macromolecules and free electrons during the activation step, the medium may be subjected to agitation or vibration. For example, ultrasound may be applied steadily at 1 W/cm$^2$ or in pulses of higher intensity. The diffusion may also be enhanced by heating the medium to reduce viscosity.

Step 3. Creating superpolarons

The inventors have discovered that the polarons that are created and diffused into the macromolecular medium during the activation step can contact each other and form stable multielectron structures called superpolarons. Because increased ferromagnetism is indicative of a collective behavior of electrons due to a quantum mechanical exchange interaction, the presence of superpolarons can be detected by monitoring the ferromagnetic momentum of the polymeric medium. Note that the accumulation of polarons and superpolarons can also be monitored by a measurement of the static dielectric constant of the medium. The ferromagnetic saturation appears to occur at 0.5-5.0 kGauss at room temperature. The time needed to reach ferromagnetic saturation depends on the initial compound used and on the thickness of the film because the migration of the polarons from the surface and their collision within the volume depends on the diffusion coefficient of the substance. Typically this time is from several hours to several weeks, but may be made shorter by certain techniques such as heating the substance or exposing it to microwave radiation. Microwave power levels may range from 100 W to 10 kW, where the higher power levels are pulsed to avoid overheating the substance. The microwaves resonate with the polarons and increase their mutual attraction.

Motivated by experimental evidence and certain theoretical assumptions, the inventors have discovered that the naturally occurring superpolarons may be joined together into long superpolaron threads provided that their concentration is high enough. It is estimated that such joining of superpolarons requires a concentration of at least $10^8-10^9$ superpolarons/cm$^3$. In order to obtain sufficient concentration for this joining, the medium is subjected to enrichment techniques. Because the superpolarons have a magnetic momentum and can be strongly polarized by an electric field, the application of external electric or magnetic fields can be used to concentrate the superpolarons. Based on this teaching, it will be appreciated by anyone of ordinary skill in the art that many techniques are possible for concentrating the number of superpolarons in the medium.

Figure 8:
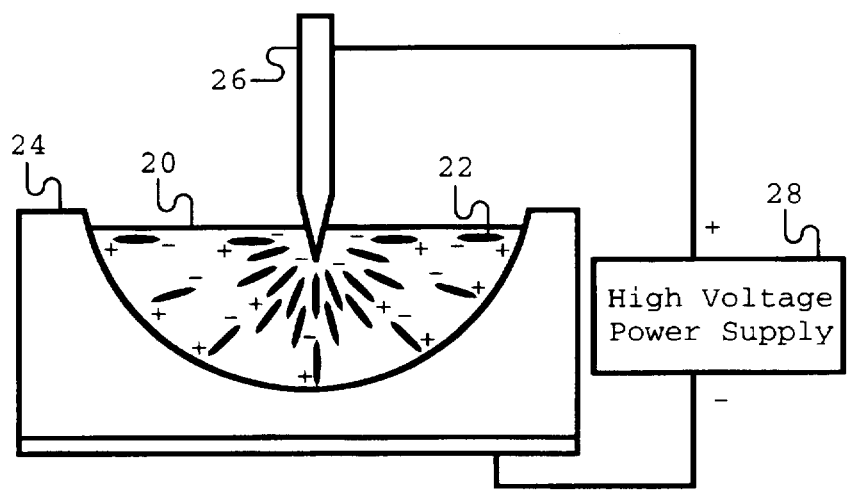
FIG. 8 illustrates a technique developed by the inventors for increasing the concentration of conductive elements in the macromolecular medium.

One example of such an enrichment technique is shown in FIG. 8. A viscose medium 20 containing superpolarons 22 is placed in a small cup 24 made of an appropriate dielectric material. The preferred diameter of the cup is 5-6 mm, although other diameters are possible. A sharp tip of an electrode 26 is placed in the medium near the center of the top surface and a high voltage is applied through a high voltage power supply 28. Preferably, a voltage of 5-10 kV is applied for several hours. Many superpolarons are naturally drawn toward the electrode tip and concentrated there. The superpolaron-enriched medium in the vicinity of the tip is then collected.

This technique can be performed with multiple electrodes if desired. It should also be noted that this procedure can be performed analogously by the application of a magnetic field instead of an electric field.

Step 4. Forming a conductor from the compound

Once the macromolecular medium has been enriched to a sufficiently high concentration of superpolarons, the material can then be used to form several types of conductors. For example, thin conducting films can be formed with the direction of conductivity perpendicular to the plane of the surface. In the case of films that are thinner than the average length of the superpolarons, the enrichment process is not necessary for conduction through the film because the superpolarons are already long enough to conduct through the film. The enrichment does, however, produce a larger density of conducting channels through the film. For films much thicker than the average superpolaron length and for the creation of long wires, however, it is necessary to join the superpolarons to form long conducting threads in the medium. Having created a sufficiently large density of superpolarons by the enrichment technique, the superpolarons can be joined by techniques that induce attractive forces between neighboring superpolarons. These techniques, like the enrichment techniques, are based on the fact that the superpolarons have a magnetic dipole moment and can be induced to have a large electric dipole moment. Thus, electric fields, magnetic fields, or a combination of electric and magnetic fields may be used to induce the superpolarons to join together forming long conducting threads in the medium.

Figure 9:
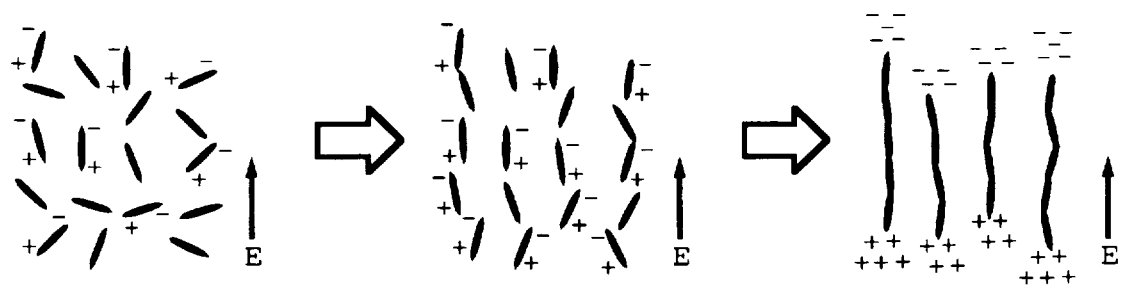
FIG. 9 illustrates a technique devised by the inventors for increasing the length of conductive elements by joining conductive elements together.

One approach to forming a conductor is to expose the medium to a strong homogeneous electric field, for example, by placing the medium between two metal plates and applying a high voltage across the plates. Due to the induced electric dipole moment of the superpolarons, they will tend to rotate so they are aligned parallel to the field lines. In addition, the superpolarons will tend to link up end-to-end, as is shown in FIG. 9.

Note that some of the superpolarons may join together in this manner during the enrichment process as well. Alternatively, the same dipole attraction illustrated in FIG. 9 is also created when an alternating magnetic field is applied to the material. The flux change induces an alternating electric dipole moment in the polarons that results in their mutual attraction. This mutual attraction can be enhanced by doping the medium with small conductive microscopic particles. Note that, although these particles are conductive, they do not participate substantially in the high conductivity through the material.

Depending on the techniques used to speed up the creation of superpolarons, this process may take as long as several hours. The macromolecular medium will then have numerous conductive threads. In principle, there is no theoretical limit to the length of an electronic thread that may be formed.

Another method for creating superpolarons and longer threads is to place a thin film of the substance on a conductive substrate and place an electrode on the surface of the film. The electrode is initially used to apply an electric field that induces the creation of superpolarons. When conduction through the medium is initiated, however, current pulses are sent through the conducting thread. When the thread can carry a significant current, say 100 A/cm$^2$, then the electrode is raised slightly. The film should be kept in contact with the raised electrode by the application of pressure on the sides or by other techniques.

Step 5. Stabilizing the compound

Once the conducting superpolaronic threads have been formed in the medium, they are generally stable structures. Brownian motion of the polymer segments, however, will cause the threads to be displaced within the medium. In particular, the ends of the threads will not necessarily remain at the surface of the medium or at the same place on the surface. Consequently, it is necessary to stabilize the macromolecular medium so that stable electrical contact with the threads can be established at the surface. The stabilization of the medium can be accomplished in several ways.

The first way to stabilize the medium is through cross-linking. As discussed in the above description of the initial macromolecular compounds, if specific chemical groups are included in the initial compound, then cross-linking may be produced between the macromolecules, thereby causing the medium to transform from a viscose liquid to an elastic solid state at room temperature. The cross-linking results in the appearance of a nonzero Young's modulus, which is a quantifiable measure that the medium has transformed into a substantially solid phase. In the case of the silicon-oxygen polymers, cross-linking may be produced by heating the substance at 150 C. for 1.0–1.5 hours.

Another way to stabilize the medium is to increase the viscosity of the matrix so much that the Brownian motion becomes negligibly small. For example, the amorphous polymer matrix may be cooled below its glassing temperature. Although such a cooled matrix is still a liquid in principle, its viscosity is so high that it has the properties of a solid. For compounds with a glassing temperature below room temperature, the stable operation of the conductor must take place at a temperature below room temperature. Some compounds, however, have a glassing point above room temperature. For these compounds, the steps of preparing the conductor take place while the medium is heated above room temperature. When the medium is then cooled to room temperature, the conductor naturally stabilizes. In the case of polyurethane, cooling below 62 C. is connected with the formation of microcrystals in the macromolecular medium. It should be noted that if the content of microcrystal exceeds approximately 50% by volume, then the conductivity suddenly disappears.

Yet another way to increase the viscosity of the macromolecular matrix is to introduce small amounts of hard microscopic particles into the matrix. Preferably, these particles are small nonconducting balls having a diameter of 0.01 μm and up to 10% concentration by volume. This technique is especially effective in the case of the polyurethanes because microscopic crystals are produced in the amorphous phase of the matrix, causing it to become more viscous. Note that these particles may also be used to enhance the ionization and creation of free electrons. In this case, only 1 vol. % concentration is needed.

The essential result of the various techniques for stabilization is to give the medium the properties of a solid. In particular, the inventors have found that sufficient stabilization is produced when the Young's modulus of the medium is at least 0.1 MPa. In accordance with this teaching, it will be appreciated by those skilled in the art that other techniques may be used for producing a Young's modulus of at least 0.1 MPa, thereby causing the required stabilization.

The conductor produced by the above method has the characteristic properties shown in column 7 of Table 1. The other columns list the corresponding properties of other known types of conductors.

TABLE 1

| | Metals and metal alloys | Ceramics | Superconducting Salts | Conjugated polymers | Compound of Bourgoin | published polymer films | Invention |
|---|---|---|---|---|---|---|---|
| Molecular weight | inorganic | inorganic | low | high | high plus metal | high 70K–300K | high >1,000 |
| Room Temp. Conductivity | <10$^6$ S/cm | <10$^4$ S/cm | low, SC at T < 12K | <10$^5$ S/cm | >10$^6$ S/cm | >10$^{11}$ S/cm | >10$^{11}$ S/cm |
| Crystallinity | Polycrystal | Polycrystal | Crystal | Polycrystal | ? | ~0 vol % | <50 vol % |
| Single Bonds | N/A | Many | Few, many double | Few, many double | Many | Many ~100% | Many >76.8% |
| Young's Modulus | >10$^4$ MPa | >10$^4$ MPa | >10$^4$ MPa | >10$^3$ MPa | ? | 0 (liquid) | >0.1 MPa |
| Oxygen Content | <0.1% | >30% | may be present | 0 | some | 3–5% | 0.1–13% |
| Static Dielec. C | ∞ | ? | ? | ∞ | ? | >4.0 | >2.4 |
| Low MW doping | no | no | yes sometimes | yes | no | no | no |
| Conduct. Particles | no | no | no | no | yes | no | no |
| Conduct. Stability | very high | high | very high | moderate | ? | low | very high |

It should be emphasized that a physical model has been presented in the above description in order to motivate the procedure and provide a deeper understanding of the essential properties of the conductor. The presentation of this model, therefore, provides teaching that enables those skilled in the art to perform many variations and alterations of the details without undue experimentation. Nevertheless, it should also be emphasized that the particular disclosed steps for preparing electrical conductors enable anyone skilled in the art to practice the invention independent of the model. Therefore, the operability of the invention is not dependent on the details of the model. For example, the following procedure describes the steps performed to produce a particular conductor without making any reference to the model.

Detailed Procedure for Producing a Highly Conducting Film

Figure 10:
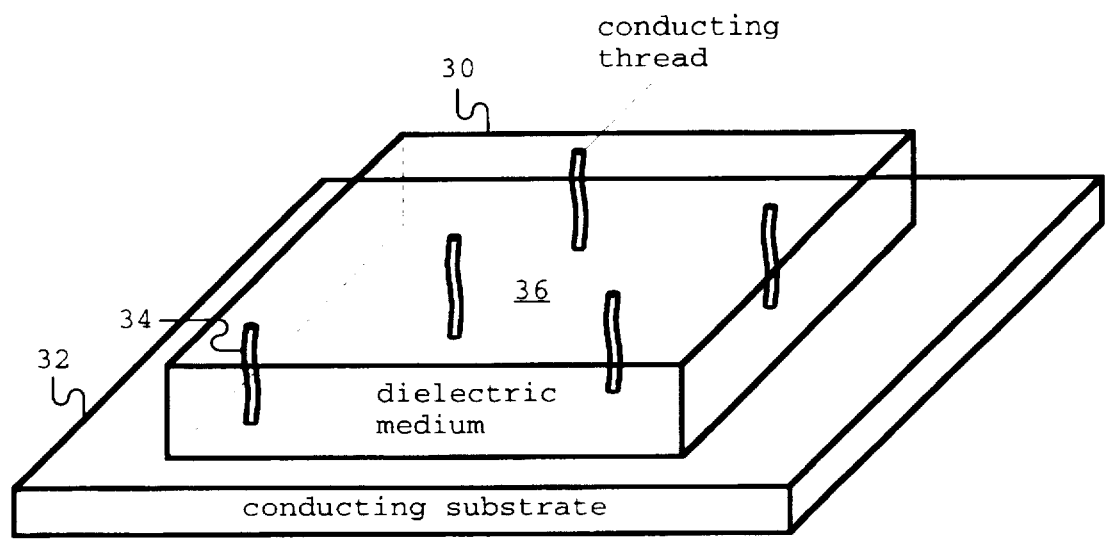
FIG. 10 shows an embodiment of the invention in the form of a thin film with conductive regions passing from one side to the other.

In a preferred embodiment of the invention, a highly conductive material is prepared in the form of a thin film 30 positioned on a conducting substrate 32, as shown in FIG. 10. The material that is produced will have a number of small conducting regions 34 separated by dielectric regions 36. This type of conducting film may be used in different types of electrical connectors. For instance, it may be used in microelectronics for precise connection of solid state chips.

Step 1

Form a mixture of PDMS having vinyl end groups (at 60 vol. % with molecular weight about 100,000) and the copolymer differing from this in that it has hydrogen side substitutes (at 40 vol. % with molecular weight 5,000). This mixture will initially be a viscose liquid at room temperature.

Step 2

Dissolve the polymer medium in an appropriate solvent such as toluene such that the concentration of the polymer substance in the solution does not exceed 1%. A conducting substrate is cleaned with the solvent and the solution is sprayed onto the surface of the substrate using a gas flow of dry nitrogen. The temperature of the substrate during spraying should be maintained between 40 C. and 70 C. The exact temperature and the rate of spraying are controlled such that the drops of solution falling on the surface dry before the next drop falls on the same point. The duration of the spraying depends on the thickness of the film desired. Spraying is performed for about an hour to obtain a film 15 µm thick.

Although free electrons are spontaneously formed during and after spraying, this process is preferably quickened by UV treatment of the film. In the preferred embodiment, a 120 Watt mercury lamp having a 5 cm tube at a working pressure of 0.2–0.3 MPa is positioned about 5 cm from the film for 4–6 hours at room temperature. The UV exposure should be continued until the ferromagnetic momentum indicates that the mean concentration of the free electrons in the film exceeds at least $3 \times 10^{17}$ electrons/cm$^3$. The ferromagnetic momentum can be measured by the well known Faraday method.

Steps 3 and 4

Figure 11:
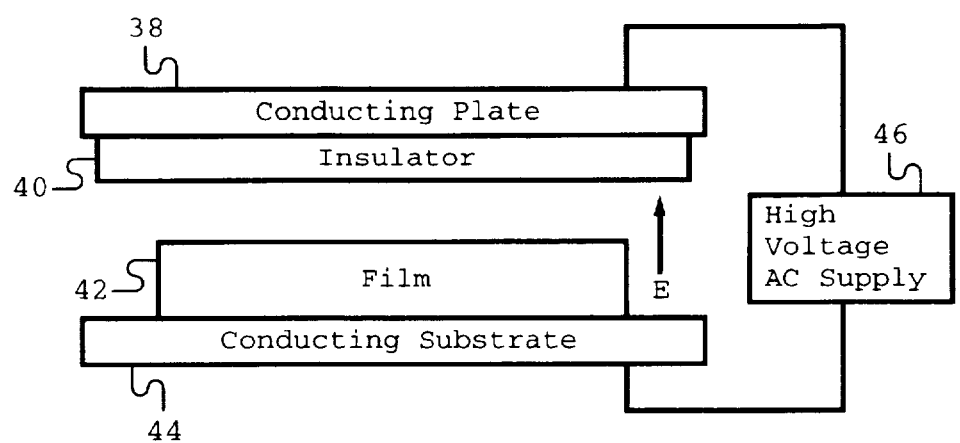
FIG. 11 illustrates a technique developed by the inventors for creating long conducting elements in the macromolecular medium.

In the case of a thin film conductor steps 3 and 4 may be combined as follows. As shown in FIG. 11, a conducting plate 38 with a layer of insulating material 40 is positioned close to the film 42 which is positioned on a conducting substrate 44. AC voltage is applied by a high voltage power supply 46 to create a mean electric field intensity of 20–25 kV/cm between the conducting substrate and the conducting plate. The alternating voltage should be applied for approximately ten days.

In the final stage of conductor preparation, the polymer medium is heated to 150 C. for 1.5 hours. Preferably, the high voltage applied during the previous step is maintained during this heating period. As a result of heating, the macromolecular medium will transform into an elastic solid and the Young's modulus should exceed the minimum value of 0.1 MPa. After the completion of this step the film is ready to be used.

Figure 12:
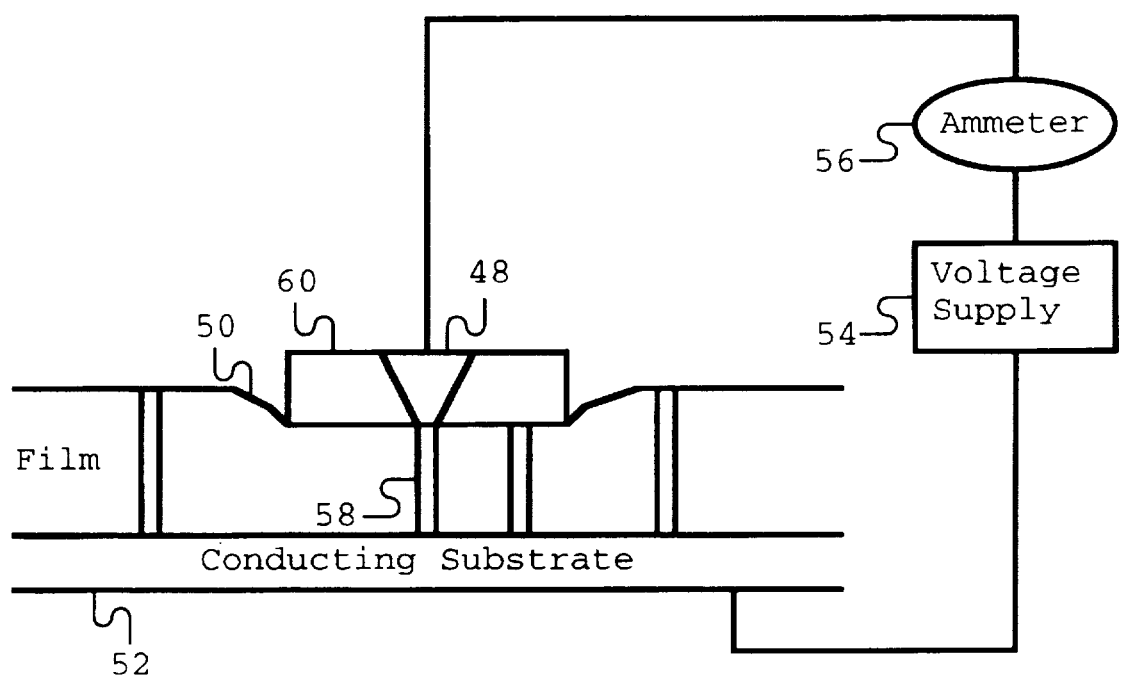
FIG. 12 illustrates the technique used by the inventors for testing the electrical properties of the conductor of the invention.

If all the steps of the preparation have been completed with care, the density of conducting threads through the film may be as large as 10,000 threads/cm$^2$, having an average spacing of about 0.1 mm. The typical mean diameter of each conducting point on the surface is 2 µm to 4 µm. The conductivity through the film may be tested as shown in FIG. 12 by placing a flat conducting electrode 48 firmly on the upper surface of the film 50 and applying a voltage between the electrode 48 and a conducting substrate 52 upon which the film 50 rests. A voltage supply 54 is used to apply the voltage and an ammeter 56 measures the resulting current. To measure the properties of individual conducting threads 58 in the film the flat electrode 48 must firmly contact only a small area of the film surface. In order to prevent damage to the film due to the application of force to such a small area, the electrode may be provided with a protective insulating ring 60 as shown.

Preferably, the electrode 48 is made of copper or gold and the insulating ring 60 is made of glass or hard plastic. The surface diameter of the electrode can be easily made as small as 10 µm to 50 µm using this technique. Care should be taken that the electrode is polished and coplanar with the ring so that it properly contacts the film.

The total resistance of the substrate-thread-electrode system can be measured and used to calculate an upper limit on the resistance of the thread by subtracting the resistances of the substrate, the electrode, and the tunnel resistances at the contact points. Using a current not exceeding 50 mA the resistance of the thread can at times be measured to be less than 0.001Ω. Based on a thread diameter of 2 µm to 4 µm and a length of 15 µm, it follows that the conductivity of the thread is significantly more than $10^6$ S/cm.

The conductivity of the threads can be measured more precisely using a current of 200 mA or more. This corresponds to a current density of over $10^6$ A/cm$^2$, so it is applied in short pulses to avoid local damage to the electrodes. Current pulses as large as 10–20 A can be used if their half-width is a microsecond or less. Simple calculations based on measurements of the heat generated in the film as a result of these pulses place an upper limit of $10^{-5}$Ω on the resistance of a thread. It follows that the conductivity of the thread exceeds $10^8$ S/cm.

Alternate Embodiments

Table 2 shows the various conductor preparation parameters used for alternate embodiments of the invention.

TABLE 2

| | Hydrocarbons | | Silicon-Oxygen based polymer | | | | Poly-urethane |
|---|---|---|---|---|---|---|---|
| | APP | IPH | PDMS | vinyl end groups | vinyl end grps, some with H side grps | vinyl end grps, diphenyl side grps | |
| Mol.weight in K amu | 4–100 | 300–1000 | 300–1000 | 15–100 | 75–100, 2–10 | 2–10 | 4.5–10 |
| Single Bond Content | 100% | 100% | 100% | >99% | >97.5% | >76.8% | >97% |
| Polymer Solvent | heptane | heptane | toluene | toluene | toluene | toluene | dimethyl-formamide |
| Film Prep. Conditions | 40–70 C. 0.5–4 hr | 40–70 C. 0.5–1 hr | 40–70 C. 0.25–1 hr | 40–70 C. 0.25–1 hr | 40–70 C. 0.25–1 hr | 40.–70 C. 0.25–1 hr | 80 C. 24 hr |
| Initial Dielectric C | 1.9–2.0 | 1.9–2.0 | 2.7 | 2.7 | 2.7 | 2.7 | 4.0 |
| Thermo-oxidation | 1–2 hr 100–110 C. | 1–2 hr 100–110 C. | None | None | None | None | None |
| Final content of oxygen | 0.1–5 atomic % | 0.1–5 atomic % | 10 atomic % | 10 atomic % | 14 atomic % | 2.8–3.1 atomic % | 6.6–15.7 atomic % |
| UV exposure time | 1–1.5 hr | 1–1.5 hr | 4–6 hr | 4–6 hr | 4–6 hr | 4–6 hr | 1–1.5 hr |
| Final Dielectric C | >2.4 | >2.4 | 2.7 | 2.7 | 2.7 | 2.7 | 4.0 |
| Production Temperature | 18–20 C. | 18–20 C. | 18–20 C. | 18–20 C. | 18–20 C. | 18–20 C. | 80 C. |
| Time for Cond creation | 2–14 days | 1–7 days | 3–10 days | 3–10 days | 3–10 days | 3–10 days | 10–30 min |
| Stabilization Process | cool to −20 C. | cool to −55 C. | cool to −130 C. | 150 C. for 1.5 hr | 150 C. for 1.5 hr | 150 C. for 1.5 hr | cool to 62 C. |
| Final Crystal Phase Content | 0% | 0% | 0% | 0% | 0% | 0% | <50% |
| Max. Film Thickness | 50–80 μm | 20–25 μm | 15–18 μm | 15–18 μm | 15–18 μm | 12–15 μm | 20 μm |

Note that the fifth column in the table corresponds to the 60%–40% mixture of two compounds used for producing the film of the preferred embodiment. The procedures for preparing these alternate types of conductors are the same as for the preferred embodiment, with the exception of the differences indicated in the table which have already been described in detail.

To initiate conduction through a thread a small voltage may be required. For example, about 3 volts applied through a 1MΩ resistor that limits the current. In addition, it may be required to apply pressure to the surface of the medium, typically on the order of 0.5–5.0 kg/cm$^2$ for small areas and about 5 kg/cm$^2$ for a square centimeter. Note that this pressure is easily achieved (100 g on a 1 mm diameter probe is over 10 kg/cm$^2$).

Figure 13:
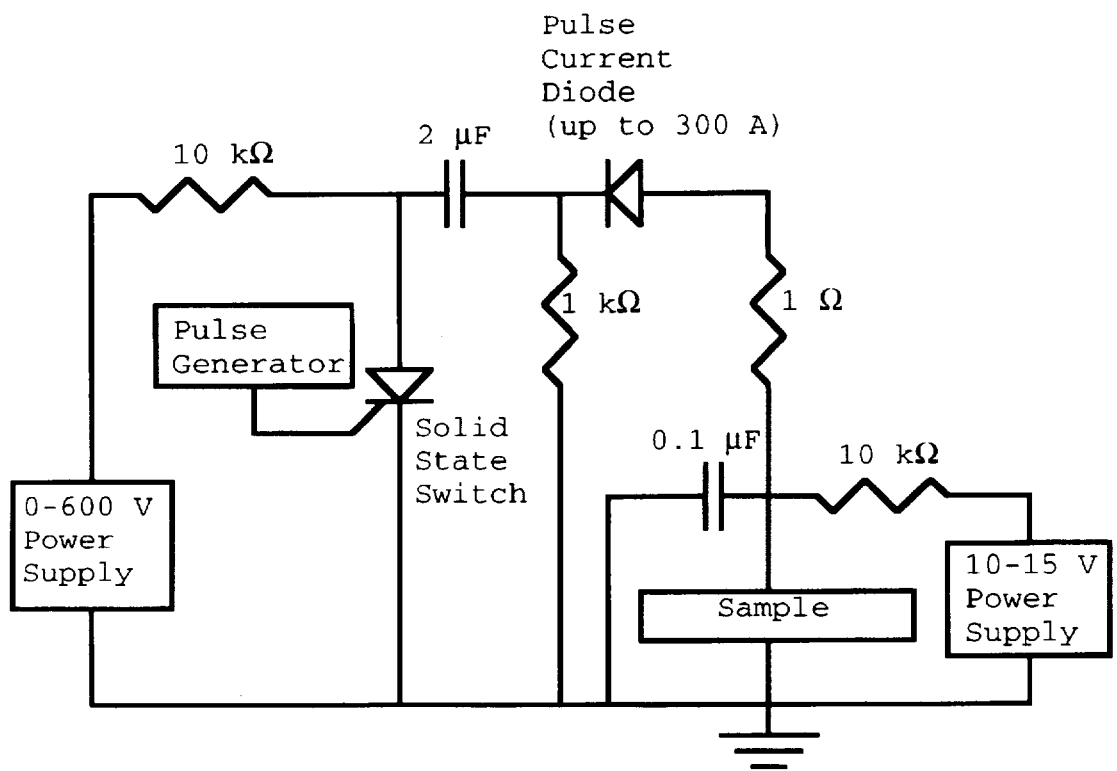
FIG. 13 is a schematic diagram of a circuit to improve the conductive properties of the material of the invention.

It should be noted that it is possible to enhance conductivity by carefully "training" the samples with a long set of current pulses of gradually increasing amplitude. Smooth bell-shaped pulses with 1–10 μs half-width repeated at 1–10 Hz are used. The initial pulse amplitude is 1 mA or less per channel and the final pulse amplitude is 10 Amps per channel. The amplitude is increased linearly with time for 30–60 min. Well-trained "young" samples of silicon based polymer have maximal current amplitude of about 10 Amps/channel. On the other hand, "old" samples can have a maximal (critical) current of over 200 Amps/channel. Well-trained samples can keep low resistivity for several hours in some cases while carrying little or no current. The circuit used to train the samples is shown in FIG. 13. This training technique can enhance the conductivity by raising the allowed current densities and by lowering the resistivity.

It will be clear to one skilled in the art that the above embodiments may be altered in many ways without departing from the scope of the invention. For example, the initial macromolecular compound used to form the conductor is not limited to those specifically discussed in this disclosure but may be any macromolecular substance that satisfies the conditions for the formation of stable superpolarons as disclosed in the teaching of the invention. Other methods may be used for inducing ionization of the macromolecular medium and for inducing the creation of superpolarons and threads. Moreover, it is obvious that these new conductive materials have application to any technology that uses previously known conductive or superconductive materials. Accordingly, the scope of the invention should be determined by the following claims and their legal equivalents.

We claim:

1. A material having regions of stable conductivity greater than $10^6$ S/cm near room temperature, the material comprising a substantially solid macromolecular substance having less than 50% volume percent crystalline phase, and absent additional conductive material that substantially participates in the conductivity of the material said material having a Young's modulus greater than 0.1 MPa near room temperature.

2. The material of claim 1 wherein the substance has an oxygen content between 0.1 atomic % and 13 atomic %.

3. A material having regions exhibiting stable conductivity of at least $10^6$ S/cm at near room temperature, the material comprising a substantially solid macromolecular substance having less than 50% volume percent crystalline phase, said material further comprising microscopic non-conducting particles and in the absence of additional conductive material that would substantially participate in the conductivity of the material.

4. A material having regions exhibiting stable conductivity greater than $10^6$ S/cm near room temperature, the material comprising a substantially solid macromolecular substance having less than 50% volume percent crystalline phase, said material having Young's modulus greater than 0.1 MPa near room temperature and in the absence of additional conductive material that would substantially participate in the conductivity of the material.

5. The material of claim 4 wherein the substance has more than 76.8% single bonds.

6. The material of claim 4 wherein the substance has a static dielectric constant whose value is finite and greater than 2.4.

7. The material of claim 4 wherein the conductivity exceeds $10^{11}$ S/cm at room temperature.

8. The material of claim 4 wherein the material significantly violates the Wiedemann-Franz law.

9. The material of claim 4 wherein the substance is a nonconjugated polymer in a substantially solid state.

10. The material of claim 9 wherein the polymer is chosen from the group consisting of a hydrocarbon, a polymer having a silicon-oxygen main chain, and a polyurethane.

11. The material of claim 10 wherein the hydrocarbon is chosen from the group consisting of oxidized atactic polypropylene and oxidized isotactic polyhexene.

12. The material of claim 10 wherein the polymer having a silicon-oxygen main chain is formed from a polydimethysiloxane having a side substitute chosen from the group consisting of a methyl group, a hydrogen groups, a diphenyl group, and an acrylic side group.

13. The material of claim 10 wherein the polyurethane is formed from the copolycondensation of 4,4'-methylenebiphenyl isocyanate and poly(buthyleneglycol adipinat).

14. An electrical conductor comprising a substantially solid mostly amorphous macromolecular substance having regions exhibiting stable conductivity of more than $10^6$ S/cm near room temperature, said substance having a Young's modulus greater than 0.1 MPa near room temperature.

15. The conductor of claim 14 wherein the substance has more than 50% amorphous phase.

16. The conductor of claim 14 wherein the substance has a static dielectric constant whose value is finite and greater than 2.4.

17. The conductor of claim 14 wherein the regions of stable conductivity are quasi-one-dimensional electronic threads.

18. A method for producing a material comprising stable regions exhibiting conductivity, having conductivity greater than $10^6$ S/cm near room temperature the method comprising:

forming a medium comprising a macromolecular substance;

generating macromolecular ions and free electrons in the medium;

inducing said free electrons to form conducting threads; and substantially solidifying the medium to stabilize the conductivity in said material, said material being in the form of a film having an approximate thickness between about 5 microns and about 100 microns said material having a Young's modulus greater that 0.1 MPa near room temperature.

19. A method for producing a material comprising stable regions exhibiting conductivity, having conductivity greater than $10^6$ S/cm near room temperature the method comprising:

forming a medium comprising a macromolecular substance;

increasing the surface area of the medium sufficiently to generate macromolecular ions and free electrons in the medium;

inducing said free electrons to form conducting threads; and thereafter substantially solidifying the medium to stabilize the conductivity said medium having a Young's modulus greater that 0.1 MPa near room temperature.

20. A method for producing a material comprising stable regions exhibiting conductivity, having conductivity greater than $10^6$ S/cm near room temperature the method comprising:

forming a medium comprising a macromolecular substance;

heating said medium sufficiently to generate macromolecular ions and free electrons in the medium;

inducing said free electrons to form conducting threads; and thereafter substantially solidifying the medium to stabilize the conductivity said medium having a Young's modulus greater that 0.1 MPa near room temperature.

21. A method for producing a material comprising stable regions exhibiting conductivity, having conductivity greater than $10^6$ S/cm near room temperature the method comprising:

forming a medium comprising a macromolecular substance;

generating macromolecular ions and free electrons in the medium;

heating said medium sufficiently to induce said free electrons to form conducting threads; and thereafter substantially solidifying the medium to stabilize the conductivity said medium having a Young's modulus greater that 0.1 MPa near room temperature.

22. A method for producing a material comprising stable regions having a conductivity greater than $10^6$ S/cm at near room temperature, the method comprising:

forming a medium comprising a macromolecular substance;

generating macromolecular ions and free electrons in the medium;

inducing the free electrons to form conducting threads; and thereafter increasing the Young's Modulus of the medium by greater than 0.1 MPa to stabilize the conductivity.

23. The method of claim 22 wherein the substance, in its initial state, is an electrical insulator, has more than 76.8% single bonds, and has a molecular weight more than 2000.

24. The method of claim 22 wherein the substance comprises a hydrocarbon.

25. The method of claim 24 wherein the hydrocarbon is atactic polypropylene (APP).

26. The method of claim 25 wherein the APP has a molecular weight more than 4000.

27. The method of claim 24 wherein the hydrocarbon is isotactic polyhexene (IPH).

28. The method of claim 27 wherein the IPH has a molecular weight more than 300,000.

29. The method of claim 22, wherein the substance comprises a polydimethylsiloxame (PDMS) and comprises methyl end groups.

30. The method of claim 22 wherein the PDMS has a molecular weight more than 300,000.

31. The method of claim 22 wherein the substance comprises a polyurethane produced by copolycondensation of a first component and a second component.

32. The method of claim 31 wherein the first component is 4,4'-methylenebiphenyl isocyanate.

33. The method of claim 31 wherein the second component is poly(buthyleneglycol adipinat).

34. The method of claim 33 wherein the second component has a molecular weight more than 2000.

35. The method of claim 31 wherein the polyurethane has a molecular weight greater than 4500.

36. The method of claim 22 wherein the medium further comprises microscopic non-conducting particles.

37. The method of claim 22 wherein the inducing step comprises subjecting the medium to vibrational energy.

38. The method of claim 22 wherein the inducing step comprises subjecting the medium to microwave energy.

39. The method of claim 22 wherein the inducing step comprises subjecting the medium to an alternating magnetic field.

40. The method of claim 22 wherein the inducing step comprises exposing the medium to an electric field.

41. The method of claim 40 wherein an electrode is used to expose the medium to an electric field.

42. The method of claim 22 wherein the step of increasing the Young's Modulus comprises inducing cross-linking between the macromolecules of the medium.

43. The method of claim 42 wherein the cross-linking is induced by heating the medium.

44. The method of claim 22 wherein the step of increasing the Young's Modulus comprises cooling the medium below its glassing temperature.

45. The method of claim 22 wherein the step of increasing the Young's Modulus comprises doping the substance with hard microscopic particles.

46. The method of claim 22 wherein the inducing step is enhanced by doping the substance with conducting microscopic particles.

47. The method of claim 22 further comprising enhancing the conductivity through the material by passing electric pulses through it.

48. The method of claim 47 wherein each of the pulses has a duration between 1 μs and 10 μs, the pulse frequency is between 1 Hz and 10 Hz, and the peak current per thread increases from less than 1 mA to about 10 A over approximately one hour.

49. The method of claim 22 further comprising the step of thermooxidizing the substance.

50. The method of claim 49 wherein the thermooxidation is performed by heating the film to at least 100° C. for at least 1 hour in an atmosphere that includes oxygen.

51. The method of claim 49 wherein the thermooxidation is performed by heating the substance until a high sensitivity IR spectrum shows the appearance of carbonyl groups.

52. The method of claim 49 wherein the thermooxidation is performed by heating the substance until its static dielectric constant is at least 2.4.

53. The method of claim 22 further comprising increasing the ferromagnetic momentum of the medium.

54. The method of claim 53 wherein the medium has a static dielectric constant greater than 2.4 after the ferromagnetic momentum is increased.

55. The method of claim 53 wherein the step of increasing the ferromagnetic momentum comprises waiting until a maximal ferromagnetic momentum is reached.

56. The method of claim 55 wherein the maximal ferromagnetic momentum is reached in the range 0.5 kGauss to 5 kGauss at room temperature.

57. The method of claim 53 wherein the step of increasing the ferromagnetic momentum of the medium comprises heating the medium.

58. The method of claim 53 wherein the step of increasing the ferromagnetic momentum of the medium comprises the substeps of placing the medium in an electric field; and extracting a portion of the medium having increased ferromagnetic momentum.

59. The method of claim 53 wherein the step of increasing the ferromagnetic momentum of the medium comprises the substeps of placing the medium in a magnetic field; and extracting a portion of the medium having increased ferromagnetic momentum.

60. The method of claim 22 further comprising monitoring the generation of free electrons.

61. The method of claim 60 wherein the monitoring is performed by measuring the ferromagnetic momentum of the medium.

62. The method of claim 60 wherein the monitoring is performed by measuring the static dielectric constant of the medium.

63. The method of claim 22, wherein the generating step is performed by exposing the medium to UV radiation.

64. The method of claim 63 wherein the medium is exposed to UV radiation for at least 1 hour.

65. The method of claim 63 wherein said medium is exposed to UV radiation for a sufficient time to generate macromolecular ions and free electrons in the medium, said free electrons having a concentration of at least about $3 \times 10^{17}$ electrons per cubic centimeter.

66. The method of claim 22 wherein the generating step comprises placing the medium in an electric field.

67. The method of claim 22 wherein the generating step comprises ionizing droplets of the substance.

68. A method for producing a material comprising stable regions having a conductivity greater than $10^6$ S/cm at near room temperature, the method comprising:

forming a medium comprising a macromolecular substance; said substance comprising a polymer having a silicon-oxygen main chain, wherein said polymer is polydimethylsiloxane (PDMS) and comprises methyl end groups;

generating macromolecular ions and free electrons in the medium;

inducing the free electrons to form conducting threads; and thereafter substantially solidifying the medium to stabilize the conductivity said medium having a Young's modulus greater that 0.1 MPa near room temperature.

69. A method for producing a material comprising stable regions having a conductivity greater than $10^6$ S/cm at near room temperature, the method comprising:

forming a medium comprising a macromolecular substance; said substance comprising a polymer having a silicon-oxygen main chain, wherein said polymer is polydimethylsiloxane (PDMS) and comprises vinyl end groups;

generating macromolecular ions and free electrons in the medium;

inducing the free electrons to form conducting threads; and thereafter substantially solidifying the medium to stabilize the conductivity said medium having a Young's modulus greater that 0.1 MPa near room temperature.

70. The method of claim 69 wherein the PDMS has a molecular weight more than 15,000.

71. The method of claim 69 wherein the polymer is a copolymer comprising methyl side groups, hydrogen side atoms and vinyl end groups.

72. The method of claim 71 wherein there are approximately three methyl side groups for each hydrogen side atom.

73. The method of claim 71 wherein the copolymer has a molecular weight more than 2000.

74. The method of claim 69, wherein the polymer is a copolymer comprising diphenyl side groups, methyl side groups, hydrogen side atoms and vinyl end groups.

75. The method of claim 74 wherein the copolymer has a molecular weight greater than 2000.

76. A method for producing a material comprising stable regions having a conductivity greater than $10^6$ S/cm at near room temperature, the method comprising:

forming a medium comprising a macromolecular substance; said substance comprising a polymer having a silicon-oxygen main chain, wherein said polymer comprises acrylic side groups;

generating macromolecular ions and free electrons in the medium;

inducing the free electrons to form conducting threads; and thereafter substantially solidifying the medium to stabilize the conductivity said medium having a Young's modulus greater that 0.1 MPa near room temperature.

77. A method for producing a material comprising stable regions having a conductivity greater than $10^6$ S/cm at near room temperature, the method comprising:

forming a medium comprising a macromolecular substance;

exposing said medium to UV radiation for a sufficient time to generate macromolecular ions and free electrons in the medium, said free electrons having a concentration in the medium of at least about $3 \times 10^{17}$ electrons per cubic centimeter;

inducing the free electrons to form conducting threads; and substantially solidifying the medium to stabilize the conductivity in said material, said material having a Young's modulus greater that 0.1 MPa near room temperature.

78. A method for producing a material comprising stable regions having a conductivity greater than $10^6$ S/cm at near room temperature, the method comprising:

forming a medium comprising a macromolecular substance;

generating macromolecular ions and free electrons in the medium;

inducing the free electrons to form conducting threads;

increasing the ferromagnetic momentum of the medium by placing the medium in an electric field and thereafter extracting a portion of the medium having increased ferromagnetic momentum; and substantially solidifying the medium to stabilize the conductivity in said material, said material having a Young's modulus greater that 0.1 MPa near room temperature.

79. A method for producing a material comprising stable regions having a conductivity greater than $10^6$ S/cm at near room temperature, the method comprising:

forming a medium comprising a macromolecular substance;

generating macromolecular ions and free electrons in the medium;

inducing the free electrons to form conducting threads;

increasing the ferromagnetic momentum of the medium by placing the medium in a magnetic field and thereafter extracting a portion of the medium having increased ferromagnetic momentum; and thereafter substantially solidifying the medium to stabilize the conductivity in said material, said material having a Young's modulus greater that 0.1 MPa near room temperature.

* * * * *